(12) United States Patent
Palanchon et al.

(10) Patent No.: US 8,066,198 B2
(45) Date of Patent: Nov. 29, 2011

(54) VALVE APPARATUS FOR REGULATING A HEAT EXCHANGE LIQUID

(75) Inventors: Hervé Palanchon, Leverkusen (DE); Jeffrey Owen Sheppard, Milton (CA)

(73) Assignee: Dana Canada Corporation, Oakville, Ontario (CA)

( * ) Notice: Subject to any disclaimer, the term of this patent is extended or adjusted under 35 U.S.C. 154(b) by 391 days.

(21) Appl. No.: 12/354,951

(22) Filed: Jan. 16, 2009

(65) Prior Publication Data
US 2010/0181516 A1 Jul. 22, 2010

(51) Int. Cl.
G05D 23/02 (2006.01)
(52) U.S. Cl. .................... 236/93 A; 236/100; 236/99 J
(58) Field of Classification Search .............. 236/93 A, 236/99 R, 99 J, 99 K, 100, 92 B
See application file for complete search history.

(56) References Cited

U.S. PATENT DOCUMENTS

| | | | |
|---|---|---|---|
| 3,768,731 A | 10/1973 | Lavado | |
| 5,924,671 A | 7/1999 | Baumann | |
| 5,944,053 A | 8/1999 | Kabierschke | |
| 5,988,514 A * | 11/1999 | Huang | 236/12.14 |
| 6,039,263 A | 3/2000 | Kalbacher et al. | |
| 6,065,682 A | 5/2000 | Frunzetti | |
| 6,223,700 B1 | 5/2001 | Sano et al. | |
| 6,253,837 B1 | 7/2001 | Seiler et al. | |
| 6,398,119 B1 | 6/2002 | Duffer et al. | |
| 6,499,963 B2 | 12/2002 | Repple et al. | |
| 6,536,740 B2 | 3/2003 | Hademenos | |
| 6,622,986 B2 | 9/2003 | Gagnon | |
| 6,793,194 B1 | 9/2004 | Grinberg | |
| 6,887,046 B2 | 5/2005 | Repple et al. | |
| 6,915,958 B2 | 7/2005 | Colas et al. | |
| 7,124,715 B2 | 10/2006 | Hutchins | |
| 7,165,513 B2 | 1/2007 | Humburg | |
| 7,275,697 B2 * | 10/2007 | Roman et al. | 236/93 R |
| 7,299,994 B2 | 11/2007 | Brown et al. | |
| 2006/0108435 A1 | 5/2006 | Kozdras et al. | |

FOREIGN PATENT DOCUMENTS
EP 0861745 A2 2/1998

OTHER PUBLICATIONS
Advertising document published by Behr at least as early as 2002 illustrating cooling module for BMW 7 series including Figures 1-7 and Figure 9 and transparent illustration.

* cited by examiner

*Primary Examiner* — Marc Norman
(74) *Attorney, Agent, or Firm* — Ridout & Maybee LLP (57) ABSTRACT

A valve apparatus can be used to select between a cold or a hot coolant for heat exchange, this selection depending on whether an attached heat exchanger is to operate as a cooler or a heater. The apparatus includes a valve housing with first and second chambers formed therein, first inlet and outlet ports for flow of a primary liquid into and out of the first chamber and further ports for flow of coolant at different temperatures through the second chamber. A linear actuator in the housing has a body containing wax and a plastic piston that is movable to an extended position by expansion of the wax. The actuator body is located in the first chamber so the temperature of the wax is dependent on the liquid's temperature in the first chamber. An end portion of the actuator adjacent to the second chamber is made of plastic. A valve mechanism for controlling coolant flow is operably connected to the piston and located in the second chamber. This mechanism includes a spool movable by the actuator.

18 Claims, 8 Drawing Sheets

FIG. 9

VALVE APPARATUS FOR REGULATING A HEAT EXCHANGE LIQUID

BACKGROUND OF THE INVENTION

This invention relates to valve apparatus for regulating flow of heat exchange liquid such as coolant, depending on the temperature of a second liquid, such as transmission oil.

A variety of systems are known for regulating the temperature of a liquid, such as oil, using a heat exchanger or an oil cooler. In particular, it is known that one can regulate the temperature of oil used in a transmission with the objective of maintaining the temperature of the oil within a desirable temperature range so the temperature of the oil is neither too hot nor too cold. In one particular system for regulating the temperature of transmission oil by means of an oil cooler, a mixing valve is provided which is able to direct either hot coolant from a vehicle engine, for example, or cold coolant flowing from a radiator, for example, through the heat exchanger so that the heat exchanger works as a heater or as a cooler. A known form of mixing valve for regulating the temperature of a liquid such as coolant includes a valve housing having first and second chambers formed therein as well as inlet and outlet ports for the flow of a liquid into and out of the first chamber. Further ports are provided in the housing for the flow of coolant at either an elevated temperature or at a lower temperature into and out of the second chamber. A linear actuator in the form of a wax motor is mounted in the first chamber and has an actuator body which contains the wax and a piston movable to an extended position by expansion of the wax when the temperature of the wax is increased to a predetermined level. Since a substantial portion of the actuator body is located in the first chamber, the temperature of the actuator body and its wax is determined to some extent at least by the temperature of the liquid flowing through the first chamber. A valve mechanism including a valve spool is operable by the linear actuator with one end of the spool being operably connected to the piston for movement therewith. The valve mechanism is located in the second chamber of the housing and is capable of controlling the flow of both coolant at the elevated temperature and coolant at the lower temperature through the second chamber.

One difficulty with this known mixing valve is that it is possible for the temperature of the wax in the wax motor actuator to be influenced by not only the temperature of the liquid flowing through the first chamber but also the temperature of the coolant in the second chamber since one end of the wax motor actuator and its piston is either adjacent to or in the second chamber. The influence of the temperature of the coolant can at least in some cases adversely affect the proper operation of the wax motor actuator.

Another difficulty with the aforementioned known mixing valve is that it requires a number of separate components or parts mounted within the valve housing for the purpose of mounting the linear actuator. In particular, in this known construction, a separate, cylindrical retainer cap is mounted in the housing between the first and second chambers and is held in place by means of a retainer clip. An end section of the wax motor actuator is mounted in this retainer cap. The annular joint between the retainer cap and the housing is sealed by an O-ring extending around the cap and an additional O-ring is required to seal the joint between the cap and the actuator.

A further difficulty with the aforementioned known mixing valve is that the valve housing employs a separate end fitting which forms one end of the second chamber and which is held in the main body of the valve housing by means of a retainer clip. This end fitting, which forms one inlet for coolant to flow into the second chamber, has mounted therein a separate valve spool supporting member which is mounted within the inlet passage by means of a retainer clip.

SUMMARY OF THE INVENTION

According to one embodiment of the present disclosure, a valve apparatus is provided for regulating a heat exchange liquid, the valve apparatus being adapted for connection to a heat exchanger having flow passages for heat exchange between the heat exchange liquid and a primary liquid having a temperature. Operation of the valve apparatus is dependent on the temperature of the primary liquid. The valve apparatus includes a valve housing having first and second chambers formed therein, first inlet and outlet ports for flow of the primary liquid into and out of the first chamber, and further ports for flow of the heat exchange liquid at either an elevated temperature or at a lower temperature into and out of the second chamber. The apparatus also has a linear actuator mounted in the valve housing, this actuator including an actuator body containing wax and a piston made of a heat insulating plastic material and removed to an extended position by expansion of the wax due to a predetermined increase in the temperature of the wax. At least a substantial portion of the actuator body is located in the first chamber so that, during use of the apparatus, the temperature of the actuator body and the wax is substantially determined by the existing temperature of the primary liquid flowing through the first chamber. The actuator body has an end adjacent to the second chamber covered with a heat insulating plastic material. A valve mechanism is operable by the linear actuator and is operably connected to the piston for movement therewith. This valve mechanism is located in the second chamber and is capable of controlling the flow of both the heat exchange liquid at the elevated temperature and the heat exchange liquid at the lower temperature through the second chamber. During use of the valve apparatus, operation of the linear actuator is substantially unaffected by the temperature of the heat exchange liquid flowing through the second chamber.

According to a second embodiment of the present disclosure, a valve apparatus is provided for regulating a heat exchange liquid, the valve apparatus being adapted for use with a heat exchanger having fluid flow passages for heat exchange between the heat exchange liquid and a primary liquid having a temperature. Operation of the valve apparatus is dependent on the temperature of the primary liquid. The valve apparatus includes a valve housing having first and second chambers formed therein along a longitudinal axis of the housing. The housing has first inlet and outlet ports for flow of the primary liquid into and out of the first chamber and further ports for flow of the heat exchange liquid at different temperatures into and out of the second chamber. The valve housing includes a separable one-piece end fitting forming one end of the second chamber and one of the further ports. This one further port is one inlet for the heat exchange liquid. A linear actuator is mounted in the valve housing and includes an actuator body containing a heat expansible material and a piston movable from a retracted position to an extended position by expansion of a material due to a predetermined increase in the temperature of the material. At least a substantial portion of the actuator body is located in the first chamber. A valve mechanism is operable by the linear actuator and is located in the second chamber. This mechanism is capable of controlling the flow of the heat exchange liquid through the second chamber. The valve mechanism includes a valve member having a first end section connected to the piston and an opposite second end section slidable in a guide passage formed in a valve supporting section of the end fitting.

According to yet another embodiment of the present disclosure, a valve apparatus is provided for regulating a heat exchange liquid at a relatively low first temperature and at a relatively high second temperature. The valve apparatus is adapted for use with a heat exchanger having fluid flow passages for heat exchange between the heat exchange liquid and a primary liquid having a temperature. Operation of the apparatus is dependent on the temperature of the primary liquid i.e. transmission oil. The valve apparatus includes a valve housing having first and second chambers formed therein and separated by an integral interior wall, first inlet and outlet ports for flow of the primary liquid into and out of the first chamber, and further ports for flow of the heat exchange liquid at the first and second temperatures into and out of the second chamber. This valve housing also includes a valve seat arrangement. A linear actuator is mounted in the valve housing adjacent to the interior wall. The actuator includes an actuator body containing a heat expansible material and a piston which, during use of the apparatus, is movable from a retracted position to an extended position by expansion of the material due to a predetermined increase in the temperature of the material because of an elevated temperature of the primary liquid in the first chamber. At least a substantial portion of the actuator body is located in the first chamber. A valve mechanism is operable by and engaged by the piston of the linear actuator, is located in the second chamber, and is adapted to control the flow of the heat exchange liquid at each of the first and second temperatures through the second chamber. The valve mechanism includes a valve member engaged by the piston and movable by the piston between a closed position where the valve member engages the valve seat arrangement and an open position where the heat exchange liquid at one of the first and second temperatures can flow through and out of the second chamber during use of the valve apparatus.

These and other aspects of the disclosed valve apparatus will become more readily apparent to those having ordinary skill in the art from the following detailed description taken in conjunction with the accompanying drawings.

BRIEF DESCRIPTION OF THE DRAWINGS

So that those having ordinary skill in the art to which the present disclosure pertains will more readily understand how to make and use the subject invention, exemplary embodiments thereof will now be described in detail herein below with reference to the drawings, wherein.

DETAILED DESCRIPTION OF PREFERRED EMBODIMENTS

Figure 1:
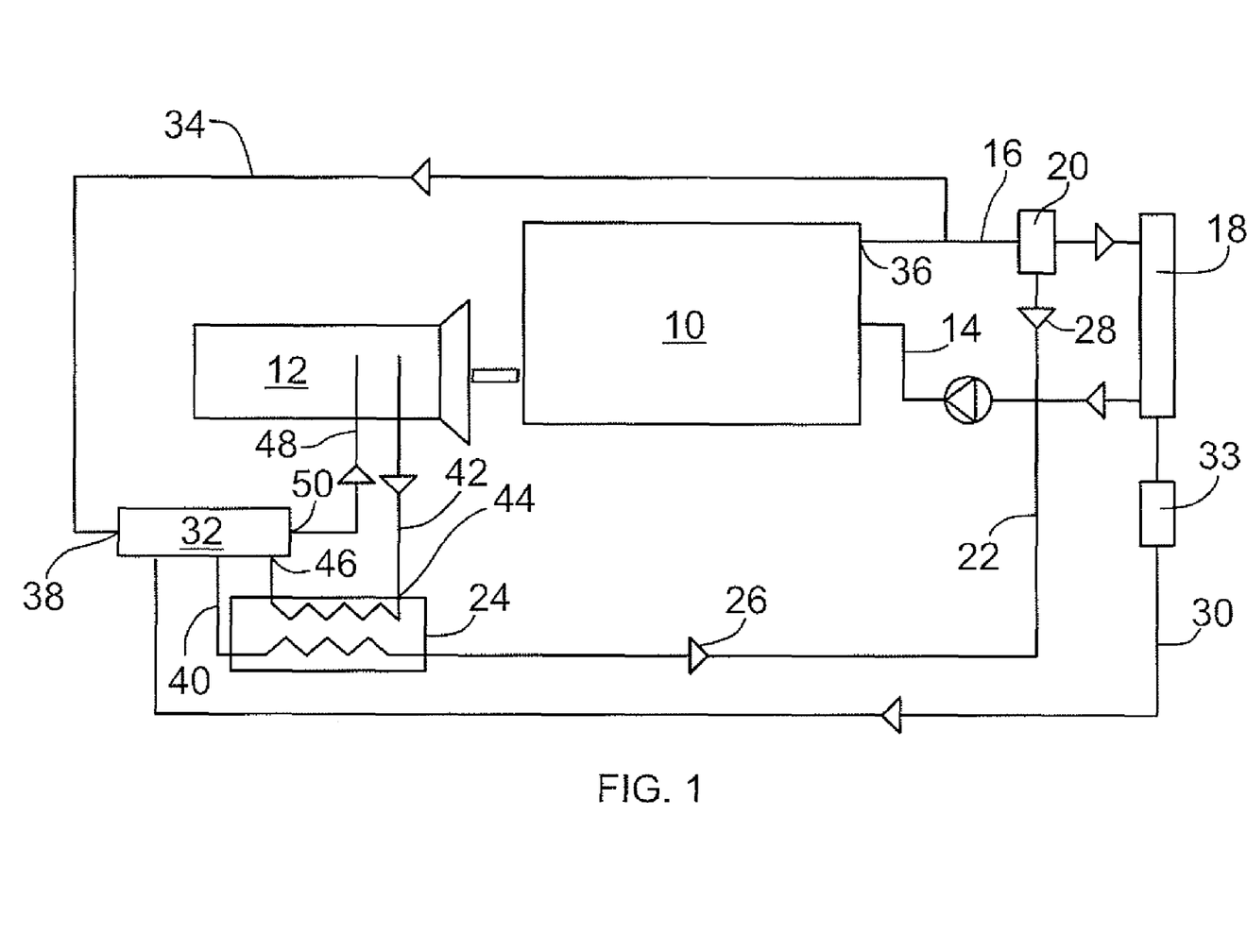
FIG. 1 is a schematic view of an engine and transmission system incorporating a radiator and an oil heat exchanger for transmission fluid or oil.
Figure 2:
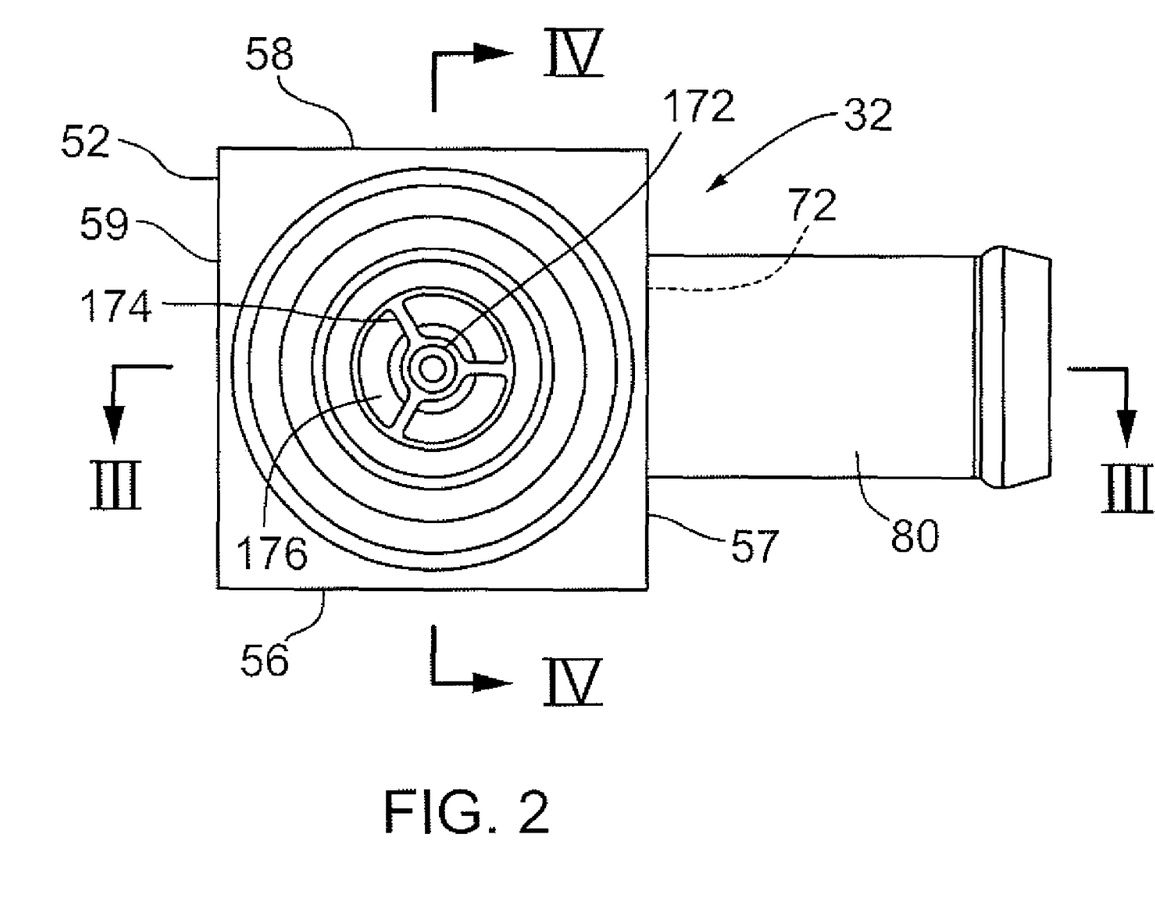
FIG. 2 is an end view of a valve apparatus constructed according to the present disclosure, this apparatus being constructed for regulating a temperature of a heat exchange liquid, such as coolant.

FIG. 1 illustrates schematically a cooling system for a vehicle engine 10 and a vehicle transmission 12. The engine 10 is cooled by means of passageways formed in the engine through which a coolant, normally a mixture of water and glycol can flow. This coolant, which is one form of heat exchange liquid, can flow into the engine through coolant pipe 14 and can flow out of the engine through coolant pipe 16. The coolant can be cooled by means of a standard radiator 18 having one outlet connected to the pipe 14 and an inlet connected to the pipe 16. Preferably an engine thermostat 20 is located in the line 16 and, depending on the temperature of the coolant, this thermostat is able to direct a portion of the coolant through coolant line 28 back to the engine. Connected to another outlet of the radiator 18 is a further coolant line 30 through which heat exchange liquid, i.e. coolant, at a lower temperature can flow through to the heat exchanger 24 via a valve apparatus 32 constructed in accordance with the present disclosure. The transmission oil heat exchanger 24 can be of standard construction. Optionally a low temperature radiator 33 can be provided in the line 30 near the main radiator 18.

Another coolant line 34 connects the coolant outlet 36 of the engine to the valve apparatus 32. This line is able to carry hot coolant from the engine to an inlet 38 located at one end of the valve apparatus. The valve apparatus 32 is connected to the oil heat exchanger by a short line or passage 40 through which coolant can flow from the valve apparatus to the heat exchanger. This coolant can be either hot coolant from the line 34 or cold coolant from the line 30. The temperature of coolant passing through the passage 40 depends upon the position of a valve member in the valve apparatus 32 as explained in more detail below. Transmission oil, which can be considered a "primary liquid" for present purposes, is able to pass from the transmission to the oil heat exchanger through a line or a pipe 42 connected to an oil inlet at 44. This primary liquid or oil is able to exit from the oil heat exchanger at 46 where it passes into the valve apparatus so the transmission oil can return to the transmission through oil line 48 which is connected to an oil outlet at 50. With this arrangement, it will be seen that the oil heat exchanger 24 is able either to heat the transmission oil by means of hot coolant or cool the transmission oil by means of the cold coolant.

Figure 3:
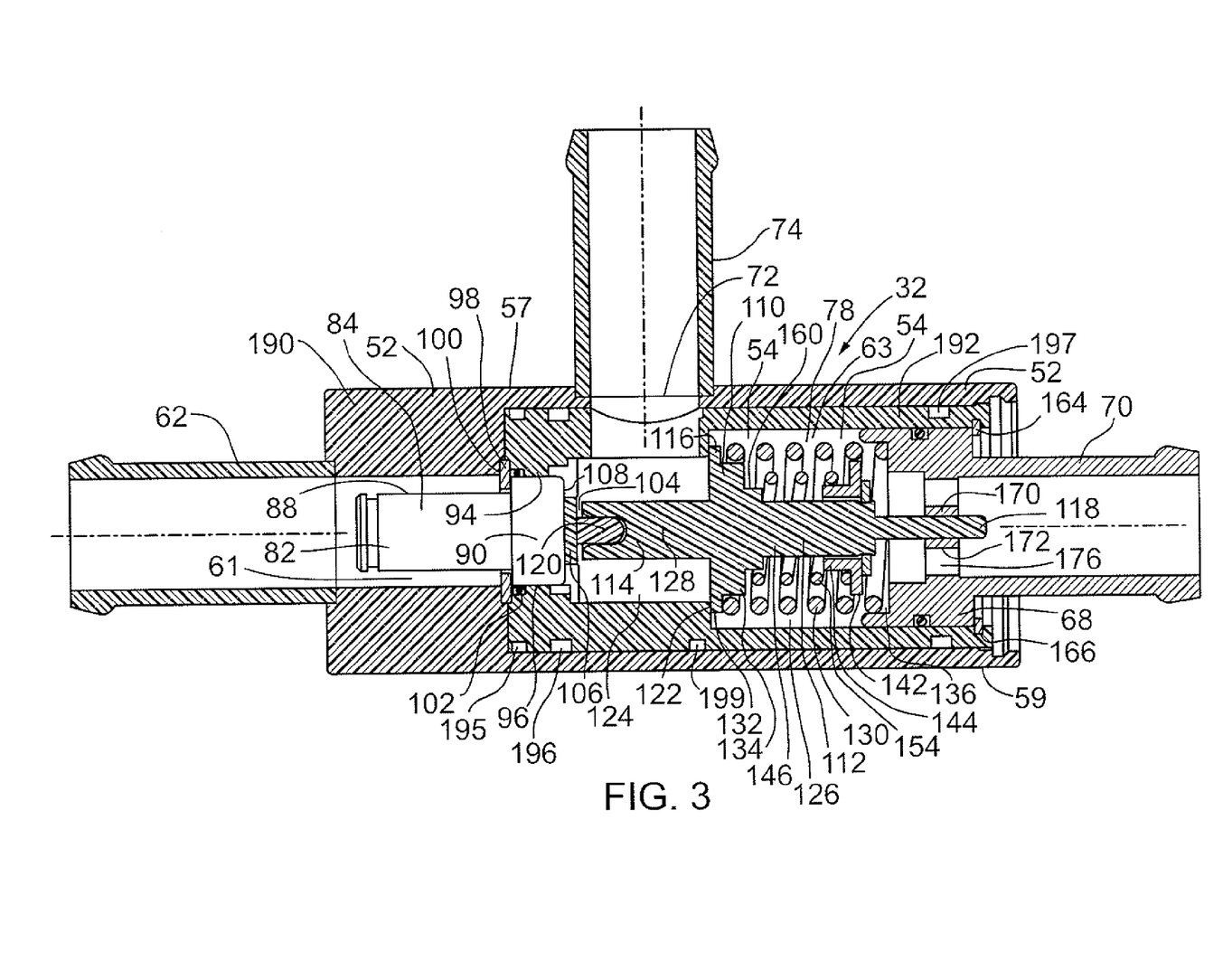
FIG. 3 is a longitudinal cross sectional view of the valve apparatus of FIG. 2 taken along the line III-III of FIG. 2.
Figure 4:
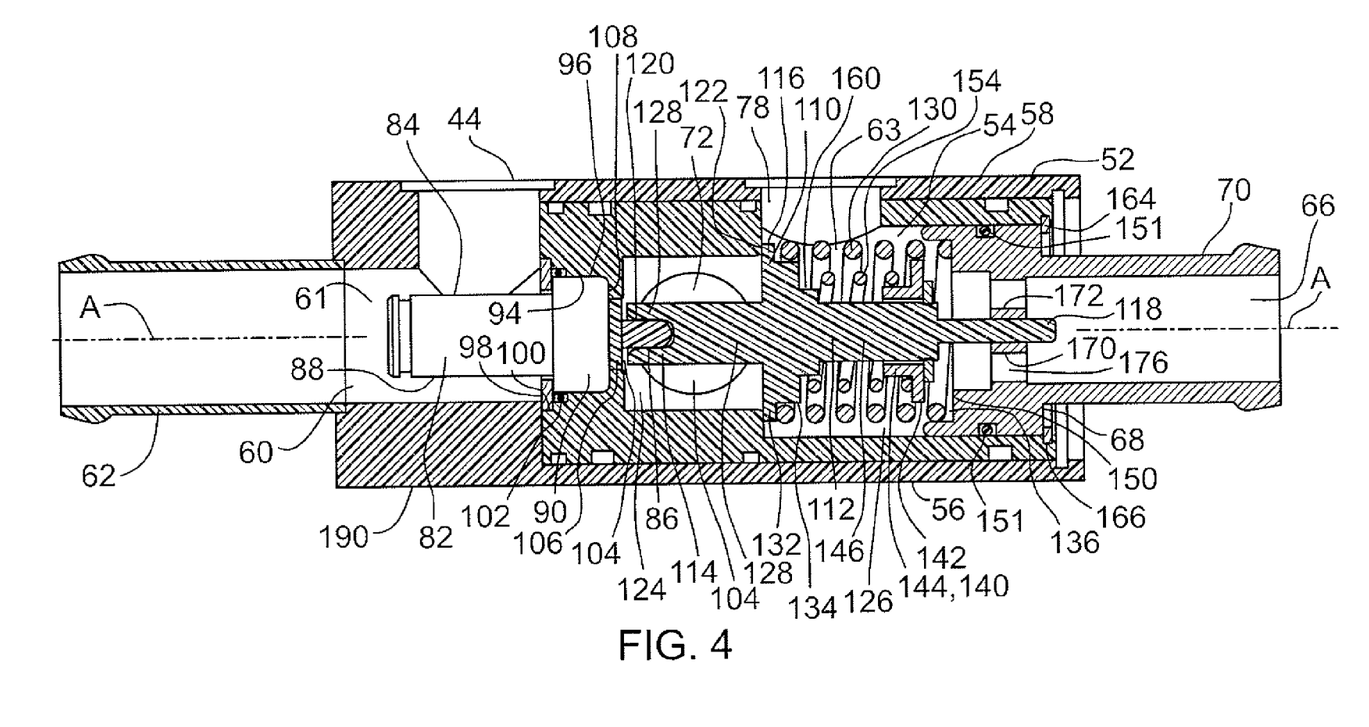
FIG. 4 is another longitudinal cross sectional view of the valve apparatus, this view being taken along the line IV-IV of FIG. 2.
Figure 5:
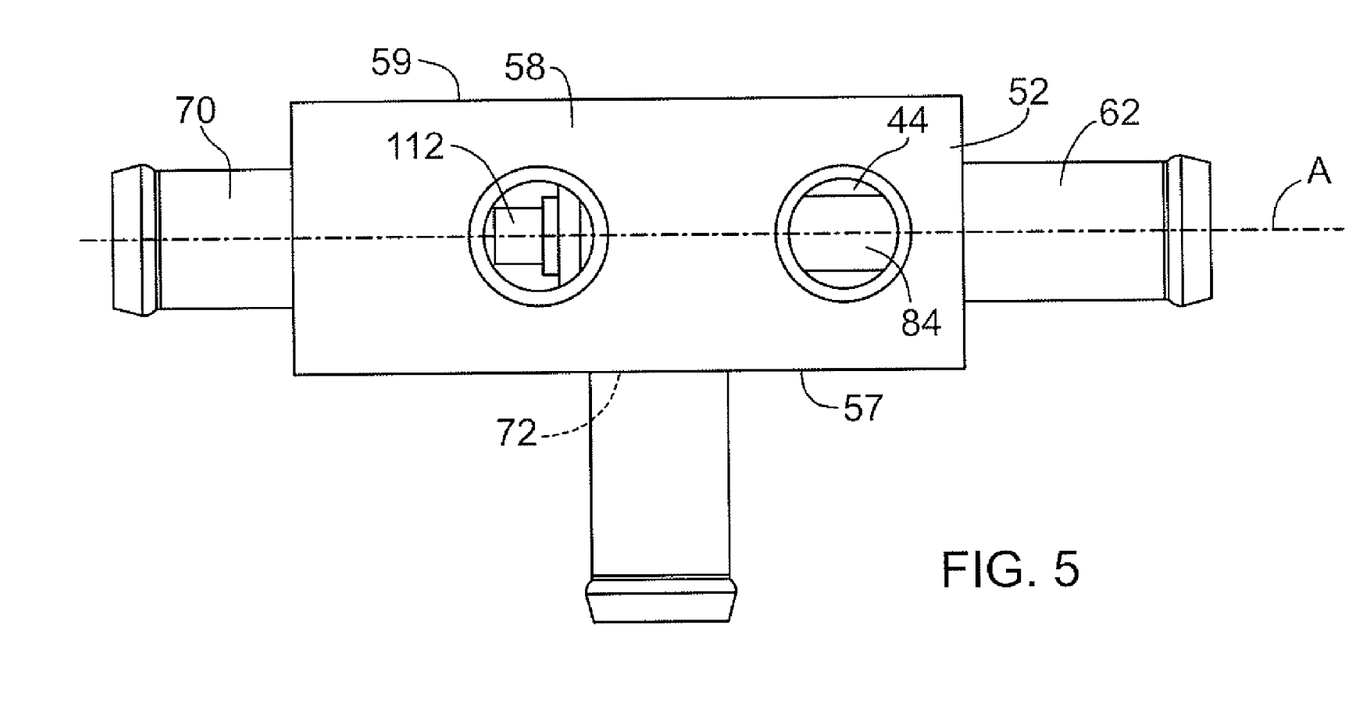
FIG. 5 is a longitudinal side view of the valve apparatus.

Turning now to the construction of a valve apparatus 32 as illustrated in FIGS. 2 to 5, this apparatus includes a valve housing 52 which can have a generally rectangular or box-like shape as shown but which has a cylindrical shape when made of a suitable plastics material. The illustrated housing has four longitudinally extending sides surrounding a main cavity 54. These four longitudinal sides are indicated at 56-59. Formed in the valve housing are a first chamber 61 and a separated second chamber 63 which, in the exemplary illustrated embodiment are arranged along a central longitudinal axis A of the valve apparatus. The housing has a first inlet port 44 for the flow of a liquid, such as transmission oil, into the first chamber 61. It also has a first outlet port 60 for the flow of the liquid, such as the transmission oil, out of the first chamber 61. If required, there can be attached to this outlet port a connecting pipe 62. This pipe and the other short pipes shown in FIGS. 2-5 can also be made of a plastics material which is compatible with or the same as the plastics material of the housing. The illustrated valve housing and connecting pipes of FIGS. 3 to 5 show the construction used when the components are made of aluminum or aluminum alloy, in which case the pipe fittings 62, 74 are welded to the housing. In a plastics version of the housing and pipes, they are molded as a single plastics part. The housing is also provided with further ports for the flow of the coolant at either an elevated temperature or a lower temperature into and out of the second chamber 63. One of these further ports can be a coolant inlet 66 formed by end fitting 68 which forms one end of the second chamber 63. This end fitting can extend from one end of the housing to form an inlet pipe indicated at 70. Formed in one of the longitudinal sides of the housing is a second coolant inlet 72 which can be connected to an inlet connecting pipe 74. The inlet 72 can be used for the flow of coolant at a lower temperature into the second chamber 63. In other words, the connecting pipe 74 can be connected to the end of coolant line 30 shown in FIG. 1. An outlet port for the flow of coolant at either an elevated temperature or at a lower temperature out of the second chamber is provided at 78. If desired, there can be connected to the side of the housing at this outlet port a short connecting pipe (not shown). This connecting pipe can be used to connect the coolant outlet to the oil heat exchanger 24 in the oil temperature regulating system of FIG. 1. In other words, the pipe can form all or part of the passage 40. Alternatively, the oil heat exchanger can be mounted directly on the valve housing (i.e. by welding or brazing for the case of an aluminum valve housing 52.

A linear actuator 82 is mounted in the valve housing and a substantial portion thereof is located in the first chamber. This actuator includes an actuator body 84 which in a known manner contains a heat expansible material, usually wax, and thus the actuator is a form of wax motor, a device commonly used in the construction of thermostats. The actuator further includes a movable piston 86 which in an exemplary version of the present valve apparatus is made of a heat insulating plastic material. The expression "heat insulating" as used in the present disclosure is intended to describe a material having a relatively low thermal conductivity, for example, compared to standard metal such as steel, aluminum and brass. As shown in FIGS. 3 and 4, the piston is in its retracted position which is the position of the piston when the wax material of the actuator is relatively cold due to liquid or oil at a low temperature flowing through the first chamber 61. It will be understood that the piston is movable to an extended position by expansion of the wax due to a predetermined increase in the temperature of the wax. The temperature range for extension of the piston varies and depends upon equipment requirements. In some wax motors the temperature can be between 70 and 90° C. In other wax motors the temperature can be between 30 and 50° C. The actuator body 84 has a cylindrical main section 88 having a smaller diameter than an end section 90 of the body. The main section 88 is a substantial portion of the actuator body that is located in the first chamber so that, during use of a valve apparatus, the temperature of the actuator body and the wax contained therein is substantially determined by the existing temperature of the liquid i.e., the oil flowing through the first chamber 61.

An exemplary form of the valve housing 52 includes an interior wall 94 in which is formed a cavity 96 which can have a cylindrical shape. The end section 90 of the actuator is fixedly mounted in this cavity which is open towards the first chamber. This end section can be held in the cavity by means of a resilient, flexible retainer ring 98 which fits in a groove 100 formed in the interior wall of the housing. An O-ring seal 102 can be mounted in a suitable annular recess formed in this interior wall adjacent to the location of the retainer ring. This seal acts to seal the joint between the end section 90 and the interior wall. The groove 100 is located adjacent to the interior wall and the retainer ring 98 engages a shoulder formed between the main section 88 and the end section 90.

Adjacent the end of cavity 96 is a central opening 104 which can be circular with its centre located along the axis A. In an exemplary version of the valve apparatus, the actuator body has a plastic end portion 106 sized to fit snugly in the opening 104. This plastic end portion is made of a plastic having low thermal conductivity so any heat from coolant in the second chamber will not easily be transmitted through the end portion even though this end portion is in contact with the coolant during use of the valve apparatus. In one exemplary embodiment, the plastic end portion 106 is about 2 mm thick. The rest of the body of the actuator is made of brass for a high thermal conductivity. If desired, the exterior of the end section 90, particularly its circumferential side wall and end wall 108 can be made of the same plastic material having low thermal conductivity.

The valve apparatus also includes a valve mechanism indicated generally at 110, this mechanism being operable by the linear actuator 82 and operably connected to the piston 86 for movement therewith. The valve mechanism is located in the second chamber 63 and is capable of controlling the flow of both coolant at an elevated temperature (hereinafter sometimes referred to as "hot coolant" and coolant at a lower temperature (hereinafter sometimes referred to as "cold coolant")) through the second chamber 63. The illustrated exemplary valve mechanism includes a valve member or spool 112 having a first end 114 engaging the piston 86, a first valve closure 116, which can be an integral central section of the spool, and a second end section 118 located opposite the first end and slidably supported in the valve housing. A first end section of the spool can be formed with a central end cavity 120 into which an outer end section of the piston extends. The housing forms a first valve seat at 122. This seat is formed where a narrower first portion 124 of the second chamber 63 meets a wider second portion 126. Both of these portions can have a cylindrical shape. The first valve closure 116 formed by the central section of the spool is substantially wider than a first end section 128 and is adapt to engage the valve seat 122 when the piston is in its retracted position (that is the position shown in FIGS. 3 and 4).

The valve mechanism includes a spring, which in the exemplary illustrated embodiment is a coil spring 130, engages the central section of the spool and thereby biases the piston 86 (through its engagement with the spool) towards its retracted position. The central section of the spool can include annular, radially extending flange 132 and an adjacent main section 134 of smaller diameter. One end of the spring 130 engages the flange 132 while its opposite end fits in a spring seat 136 formed on the inner end of the end fitting 68. When the wax in the actuator is heated up by hot oil in the first chamber, the piston is moved to an extended position and this in turn moves the first valve closure 116 to an open position. In this position, cold coolant can flow through the inlet 72 into the second chamber 63 and then exit through coolant outlet port 78. This coolant can then flow through passageways formed in the oil heat exchanger 24 (for example) to cool the transmission oil or fluid.

The exemplary illustrated valve mechanism includes a second valve closure 140 movably mounted on the spool 112 in the second chamber. This valve closure can have a radially extending flange section 142 at one end of tubular section 144. The tubular section has an internal diameter corresponding closely to a cylindrical section 146 of the spool. The valve closure 140 is moved between an open position shown in FIGS. 3 and 4 to a closed position where the closure member engages a second valve seat 150 formed by the end fitting 68 which forms part of the valve housing. In the open position, coolant at an elevated temperature is able to flow through the inlet pipe 70 into the second chamber during use of the valve apparatus. This hot coolant exits through the outlet port 78 after flowing through the second chamber. In this mode of operation, the first valve closure 116 engages its valve seat and thereby prevents cold coolant from flowing through the second chamber. When the valve closure 140 is in its closed position, coolant at an elevated temperature is prevented from flowing through the second chamber.

The exemplary valve mechanism further includes a secondary spring 154 which can also be a coil spring. This spring has a smaller diameter than the coil spring 130 and in fact is mounted within the larger spring and arranged on the spool. The secondary spring, which is also located in the second chamber, engages the second valve closure 140 and biases this valve closure towards its closed position. One end of this spring engages the flange section 142 of the valve closure while the opposite end of the spring engages a side of the first valve closure 116 as shown. A short spring holding section 160 can be formed on the spool to help centre the adjacent end of the spring 154. It should be noted that, in an exemplary version of the present valve, mixing of the cold coolant and the hot coolant is possible during transient conditions that can exist between a cold start and normal operating conditions. This mixing will occur when the piston 86 is only partially extended.

As indicated, one end of the valve housing is formed in part by the end fitting 68 which is located in a main passageway formed in the main section of the valve housing. In order to hold the end fitting in place, a retainer clip 164 of standard construction can be used, this clip being received in an annular groove 166 formed in the main section of the housing near its coolant inlet end. In order to seal the joint between the end fitting and the main section of a housing, an O-ring seal 151 can be used, this seal extending around the end fitting and located in an annual groove formed in the end fitting.

The aforementioned second end section 118 of the spool in an exemplary version is a pin-like section having a relatively narrow width compared to both the first end section 114 and the cylindrical section 146. A guide passage 170 is formed in a valve supporting section 172 of the end fitting. This valve supporting section can include a short sleeve-like section that extends around the pin-like section of the spool and radially-extending spokes 174. In the illustrated embodiment, there are three of these spokes which can be seen in FIG. 2 but there could be fewer or more connecting spokes provided. Located between these spokes are relatively small arc-shaped coolant passages 176. In this way, hot coolant is able to flow through the inlet pipe 70, through the passages 176 and into the second chamber. The passages 176 can also be described as apertures. It is possible for these passages to have a different shape than that shown in FIG. 2, for example, a cylindrical shape. By making the valve supporting section 172 including the spokes 174 an integral part of the ending fitting rather than a separate part, one can obtain a simplified structure. For example, one can avoid the need to provide a separate connector to hold the valve supporting section in place. By way of further explanation, the use of an additional retainer clip mounted inside the end fitting in order to hold the valve supporting section 172 in place can be avoided. With the present simplified structure, the valve apparatus can be easier to build and assemble.

With respect to the construction of the exemplary version of the actuator body and in particular the plastic end portion 106, one type of plastic that can be used which is characterized by low thermal conductivity is nylon 66. The same plastic can be used to make the pin or piston 86.

An advantageous feature of the above described exemplary valve apparatus is the use of the integral interior wall which can be made of the same plastic as the housing itself. This interior wall, which can be referred to as a retainer, is less expensive compared to a separate metal retainer cap mounted within the housing since a metal retainer cap for this purpose can be difficult to form.

As indicated, the housing 52 can be made of one or more suitable plastic materials and the plastic or plastics chosen must be compatible with the fluids flowing through the housing. One plastic that can be used when the liquid flowing through the first chamber is transmission oil or automatic transmission fluid is sold under the name Stanyl PA 46, a plastic which has a melting temperature of about 295° Celsius. However, another type of plastic such as nylon 66, can be used for plastic parts in contact with the coolant flowing through the second chamber. In order to permit these two different types of plastic to be used for the housing, the housing can be constructed in the manner illustrated in FIGS. 3 and 4. In particular, the main portion of the housing can include an outer housing section 190 and an inner housing section 192. The section 190 surrounds the main section 88 of the actuator and defines the first chamber 61 to a large extent. The connector pipe 62 can be connected to this outer section. The inner housing section 192 forms the circumferential perimeter of the second chamber 63. It can have a cylindrical exterior and be received in a cylindrical cavity formed in the outer housing section as shown. The joint between the two sections can be sealed by means of O-ring seals located at 195-197 and also at 199. As indicated, a suitable plastic for the outer housing section 190 is Stanyl PA 46, while a suitable plastic for the inner housing section 192 is low cost Nylon 66. It will be appreciated that if the valve apparatus 32 is constructed of plastic, it cannot be brazed to an oil heat exchanger which is being used with the apparatus. However, it is still a straightforward process to connect the valve apparatus to a metal heat exchanger, for example, by using known quick connections. Furthermore, cost savings can be achieved by constructing the valve apparatus using the described plastic components including the valve housing as compared to the cost of making a similar valve apparatus using aluminum parts. A less expensive construction that can be used for this valve is to form the valve housing 52 (and if desired the illustrated connecting fittings) as a single plastics part. In this embodiment the illustrated housing sections 190 and 192 are unified as a single plastics part.

Figure 6:
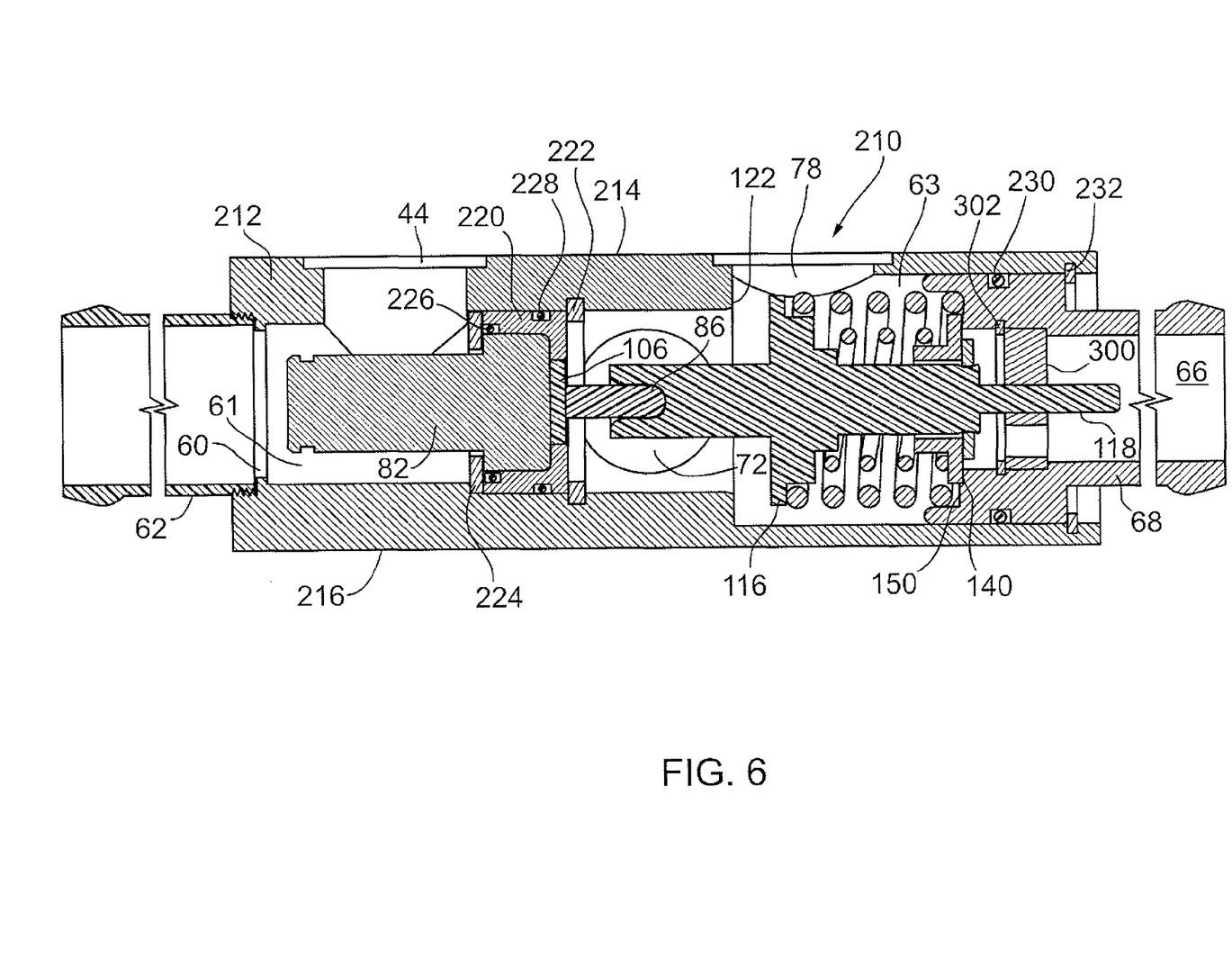
FIG. 6 is a central longitudinal cross-sectional view of another embodiment of a valve apparatus constructed according to the present disclosure.

An alternate form of valve apparatus 210 which can be made of aluminum is illustrated in FIG. 6. This embodiment has a valve housing 212 which can also be rectangular or box-like with four longitudinal sides including opposite sides 214 and 216. As in the first embodiment of FIG. 3, the housing forms a first chamber 61 and separated second chamber 63 which are arranged along the central longitudinal axis of the valve apparatus. This housing 212 also has a first inlet port 44 for the flow of a liquid such as transmission oil into the first chamber. It has a first outlet port 60 for the flow of the liquid out of the first chamber. A tubular fitting 62 can be connected to the outlet port. The housing is provided with further ports for the flow of coolant at either an elevated temperature or a lower temperature into and out of the second chamber 63. One of these ports is the coolant inlet 66 formed by end fitting 68. The fitting 68 can also be described as a valve cover. Formed in one of the longitudinal sides of the housing is a second coolant inlet 72 which can be connected to a coolant inlet pipe similar to the pipe 74 of FIG. 3. An outlet port for the flow of coolant at either an elevated temperature or at a lower temperature out of the second chamber is provided at 78.

In the apparatus 210 there is a linear actuator 82 and except for the changes noted hereinafter, this actuator is mounted in the valve housing in a manner similar to the actuator of FIGS. 3 and 4. The actuator includes a movable piston $6 made of metal or a heat insulating plastic material. In this embodiment the head of the actuator is mounted in a separate cylindrical retainer cap 220 which is made of a suitable heat insulating plastic such as PA 6.6. One end of the retainer cap is held against axial movement by a retainer clip 222. The shoulder formed by the head portion of the actuator rests against and is held by a flat washer 224 which in turn is held in position by an annular shoulder formed about the valve chamber. An O ring seal 226 seals the joint around the head portion of the actuator and the cap. Another O ring seal 228 seals the cylindrical joint between the cap 220 and the housing. As in the first embodiment the actuator body has a plastic end portion 106 which has a low thermal conductivity so that heat or cold from coolant in the second chamber 63 is not quickly transmitted through the end portion of the actuator.

In this embodiment the end fitting 68, which can be made of aluminum or plastic, is mounted directly to the single housing member that forms both the exterior of the housing and the first and second chambers therein. The joint between the end fitting or valve cover 68 and the housing is sealed by an O ring seal 230. The end fitting is held in the housing member by an annular retaining clip 232. The second end section 118 of the spool is slidable in a separate shaft washer 300 held by a retainer clip 302. Alternatively, the end fitting 68 and shaft washer can be molded as a single plastic component similar to that shown in FIG. 3.

The valve apparatus is shown in FIG. 6 in the hot oil position and the cold coolant is entering the chamber 63 through the inlet 72. In this position, the first valve closure 116 is in an open position away from the first valve seat 122. Also the second valve closure 140 is in a closed position where this member engages the second valve seat 150. It is also possible with this valve apparatus for the valve member to assume an intermediate position wherein neither the port at the first valve seat 122 nor the port of the second valve seat 150 is completely closed by their respective valve members. In this valve position hot and cold coolant can mix with each other in the chamber 63 before flowing out through outlet port 78. In a third position of this valve apparatus, which is assumed when the oil flowing through the first chamber 61 is cold, the first valve seat is engaged by the valve closure 116 while the port defined by the second valve seat 150 is open. In other words, hot coolant flows through the inlet 66 into the chamber 63 and cold coolant cannot flow into this chamber.

Figure 7:
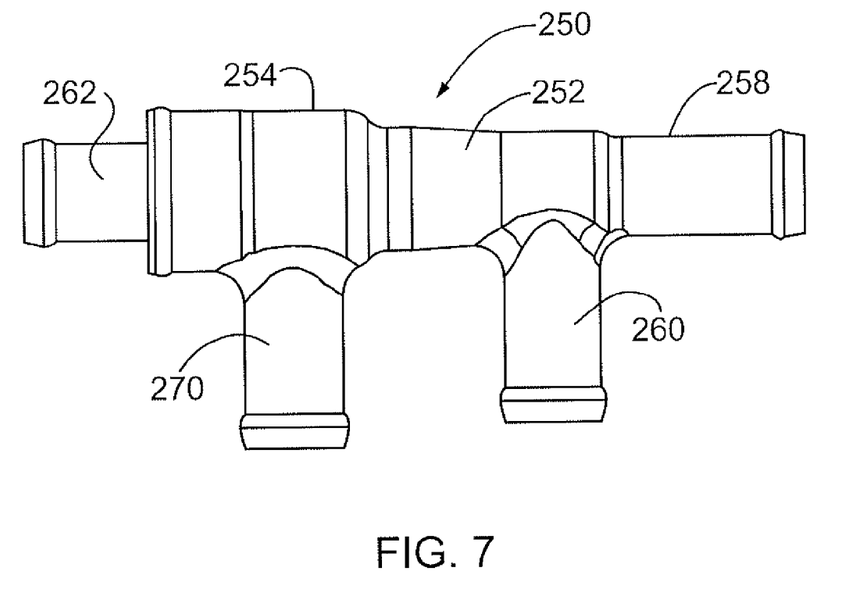
FIG. 7 is a side view of a further embodiment of a valve apparatus constructed according to the present disclosure.
Figure 8:
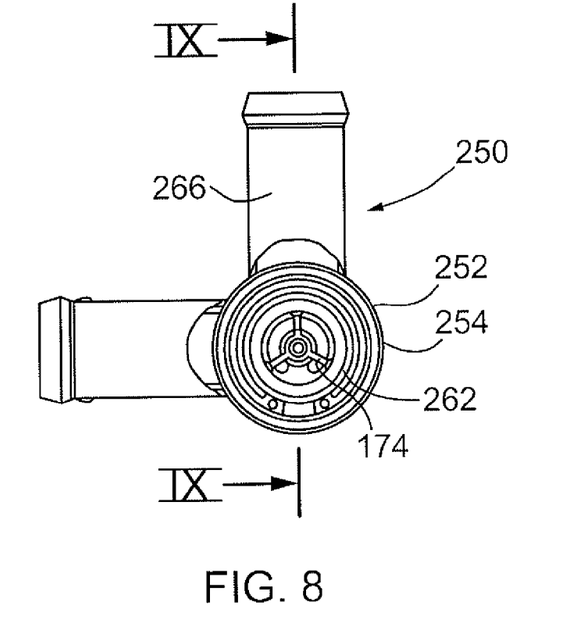
FIG. 8 is an end view of the valve apparatus of FIG. 7 as seen from the left end of FIG. 7; and, FIG. 9 is a central longitudinal cross-section of the valve apparatus of FIG. 7.
Figure 9:
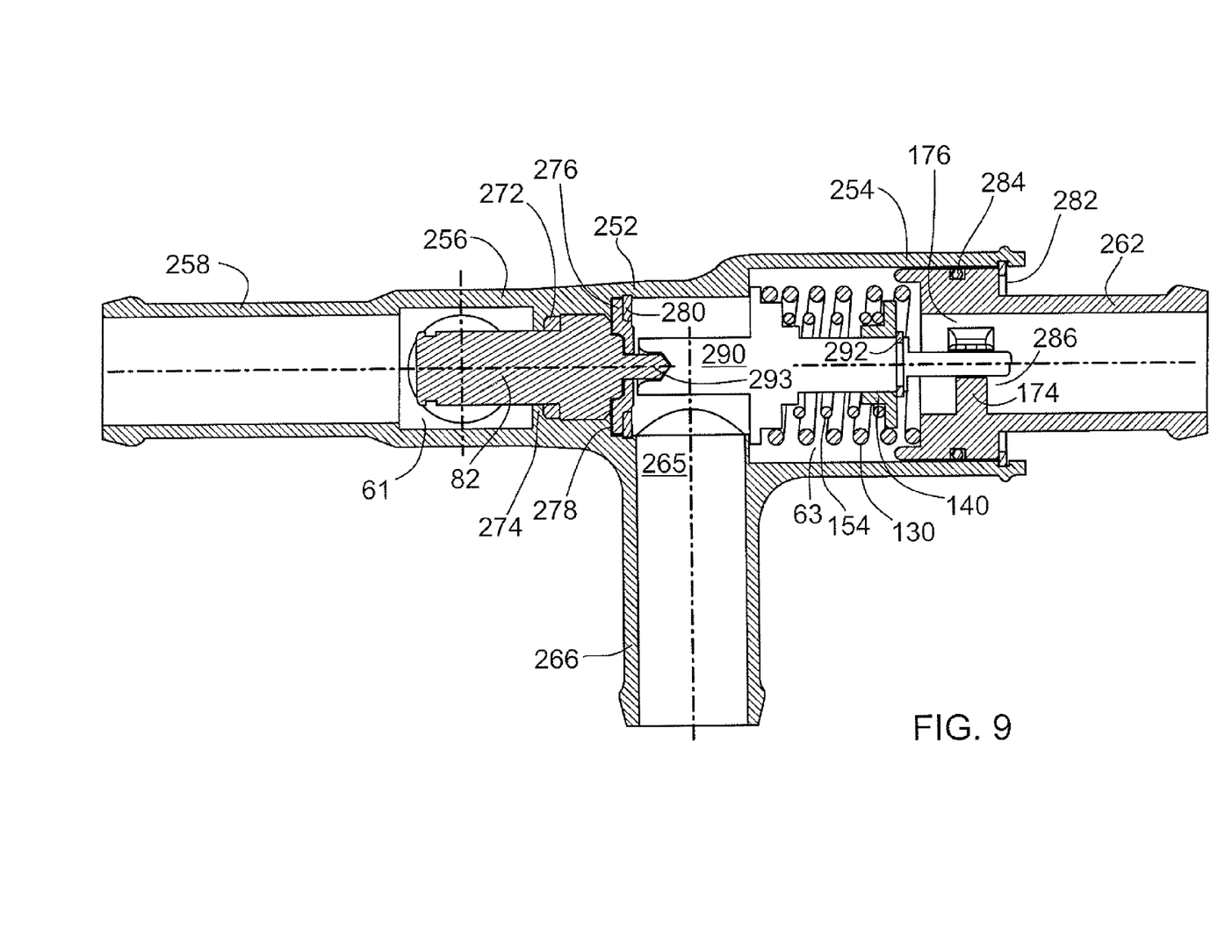

Another embodiment of a valve apparatus according to the present disclosure is illustrated in FIGS. 7 to 9. Except for the differences noted hereinafter, this valve apparatus 250 is similar in its construction to the embodiments discussed above. This valve apparatus includes a valve housing 252 which can be made of a suitable plastics materials and which has a generally cylindrical shape. This housing has a main section 254 having a relatively wide diameter and a narrower second section 256 which is integrally connected to the main section and in which is mounted the linear actuator 82. Integrally connected to the second section 256 is a straight pipe section 258 which forms an outlet for the flow of liquid such as transmission oil. Another integral connecting pipe 260 provides a first inlet port for the flow of the transmission oil into the first chamber 61 of the housing 252. Further ports for the flow of the coolant at either an elevated temperature or a lower temperature into and out of the second chamber 63 are provided. One of these ports can be a coolant inlet formed by an end fitting or cap 262 which is also made of plastic. Formed in one side of the housing is a second coolant inlet 265 which is connected to an integral inlet pipe 266. An integral outlet pipe 270 is connected to an outlet port for the second chamber 63.

The linear actuator is mounted in a cylindrical cavity formed in the plastic housing as shown in FIG. 9. The expanded head portion of the actuator presses against an O ring seal 272 which is held in place by an annular wall 274 that defines one end of the first chamber 61. The piston end of the actuator body is engaged by an actuator cap 276 which can be made of a heat insulating plastic having low thermal conductivity. A suitable plastic is PA 6.6 or a suitable derivative. The cap is held in place by an annular shoulder 278 formed about the interior of the housing. A retaining clip 280 acts to hold the coolant side of the cap in place.

The end fitting 262 is held in an end section of the housing by means of a retaining clip 282. The wide portion of this end fitting is sealed about its perimeter by an O ring seal 284. The end fitting 262 provides a coolant inlet at 286 and, as in the embodiment of FIG. 3, there is a short sleeve-like section provided in this inlet which is integrally connected by spokes 174 to the main portion of the end fitting. Hot coolant is able to flow through the passage formed by the end fitting 262 and through the passages 176 into the second chamber 63. The valve shaft 290 is connected to the piston 293 of the actuator. Extending around the spool which includes the valve shaft is the return spring 130 which is in the form of a coil spring. Co-axial with and located within the return spring is the coil spring 154 which can be described as an override spring. One end of this spring engages the flange formed about the second valve closure 140. A retaining clip 292 holds the closure 140 on the spool. It will be appreciated that this plastic valve apparatus 250 functions in substantially the same manner as the first and second embodiments described above.

While the present invention has been illustrated and described as embodied in an exemplary embodiment, that is an embodiment having particular utility regulating a temperature of a liquid such as automatic transmission fluid by means of a heat exchanger and a coolant such as a water-glycol mixture, it is to be understood that the present invention is not limited to the details shown herein, since it will be understood that various omissions, modifications, substitutions and changes in the forms and details of the disclosed system and valve apparatus and their operation may be made by those skilled in the art without departing in any way from the spirit and scope of the present invention.

The invention claimed is:

1. A valve apparatus for regulating flow of a heat exchange liquid, the valve apparatus being adapted for connection to a heat exchanger having flow passages for heat exchange between said heat exchange liquid and a primary liquid having a temperature, operation of the valve apparatus being dependent on the temperature of said primary liquid, said valve apparatus comprising:

a valve housing having first and second chambers formed therein, first inlet and outlet ports for flow of said primary liquid into and out of said first chamber, further ports for flow of said heat exchange liquid at either an elevated temperature or at a lower temperature into and out of said second chamber;

a linear actuator mounted in said valve housing, said actuator including an actuator body containing wax and a piston made of a heat insulating plastic material and movable to an extended position by expansion of said wax due to a predetermined increase in the temperature of said wax, at least a substantial portion of said actuator body being located in said first chamber so that, during use of said apparatus, the temperature of the actuator body and said wax is substantially determined by the existing temperature of said primary liquid flowing through said first chamber, said actuator body having an end portion adjacent said second chamber made of a heat insulating plastic material; and a valve mechanism operable by said linear actuator and operably engaged by said piston for movement therewith, said valve mechanism being located in said second chamber and capable of controlling the flow of both said heat exchange liquid at said elevated temperature and said heat exchange liquid at said lower temperature through said second chamber, said valve mechanism including a spool having a first end engaged by said piston, a first valve closure arranged on said spool, and a second end section located opposite said first end and slidably supported in said valve housing; and a primary spring mounted in said second chamber so as to bias said spool to a valve closing position where said valve closure engages a first valve seat formed in said valve housing, wherein during use of said valve apparatus, operation of the linear actuator is substantially unaffected by the temperature of said heat exchange liquid flowing through the second chamber.

2. A valve apparatus according to claim 1 wherein said valve mechanism further includes a second valve closure slidably mounted on said spool in said second chamber and movable between an open position, which allows said heat exchange liquid at said elevated temperature to flow through said second chamber during use of the valve apparatus, and a closed position where said second valve closure engages a second valve seat formed in said valve housing and prevents said heat exchange liquid at said elevated temperature from flowing through said second chamber.

3. A valve apparatus according to claim 2 wherein said valve mechanism further includes a secondary spring arranged on said spool and positioned in said second chamber and said secondary spring engages said second valve closure and biases said second valve closure towards its closed position.

4. A valve apparatus according to claim 1 wherein said valve housing includes an end fitting forming one end of said second chamber furthest from said linear actuator and one of said further ports which enables flow of said heat exchange liquid into said second chamber, said end fitting providing a guiding support for said second end section of the spool.

5. A valve apparatus according to claim 4 wherein said guiding support is an integral part of said end fitting and is formed with a central axial passage into which said second end section of the spool extends for sliding movement therein.

6. A valve apparatus according to claim 1 wherein said valve housing includes a central supporting section forming a retainer for said linear actuator and separating said first and second chambers, and wherein an end section of said linear actuator is mounted rigidly in said retainer.

7. A valve apparatus according to claim 6 wherein said central supporting section is an integral part of the valve housing and is formed with a central aperture through which said piston extends.

8. A valve apparatus according to claim 1 wherein said end portion of the actuator body located adjacent said second chamber is an end plate made of said heat insulating plastic material.

9. A valve apparatus for regulating flow of a heat exchange liquid the valve apparatus being adapted for connection to a heat exchanger having flow passages for heat exchange between said heat exchange liquid and a primary liquid, operation of the valve apparatus being dependent on the temperature of said primary liquid, said valve apparatus comprising:

a valve housing having first and second chambers formed therein along a longitudinal axis of the housing, first inlet and outlet ports for flow of said primary liquid in and out of said first chamber, further ports for flow of said heat exchange liquid at different temperatures in and out of said second chamber, said valve housing including a separable, one-piece end fitting forming one end of said second chamber and one of said further ports, said one further port being one inlet for said heat exchange liquid;

a linear actuator mounted in said valve housing, said actuator including an actuator body containing a heat expansible material and a piston movable from a retracted position to an extended position by expansion of said material due to a predetermined increase in the temperature of said material, at least a substantial portion of said actuator body being located in said first chamber; and a valve mechanism operable by said linear actuator, located in said second chamber, and capable of controlling the flow of said heat exchange liquid through said second chamber, said valve mechanism including a valve member having a first end section engaged by said piston and an opposite second end section slidable in a guide passage formed in a valve supporting section of said end fitting.

10. A valve apparatus according to claim 9 wherein said valve member is a valve spool having a central section which is substantially wider than said first end section and is adapted to engage a valve seat formed in said valve housing when said piston is in its retracted position and said valve mechanism includes a return spring which engages said central section and thereby biases said piston towards its retracted position.

11. A valve apparatus according to claim 10 wherein said valve mechanism includes a valve closure member slidably mounted on said valve spool and movable between a closed position where said valve closure member engages a further valve seat formed on said end fitting and an open position, which allows said heat exchange liquid at an elevated temperature to flow through said one further port into said second chamber.

12. A valve apparatus according to claim 11 wherein said second end section of the valve member is a pin-like section having a relatively narrow width compared to said first end section and said central section thereof and said valve supporting section of the end fitting includes a centrally located sleeve section having apertures distributed around its periphery for flow of said coolant into said second chamber.

13. A valve apparatus according to claim 9 including a retainer clip for holding said end fitting in a main passageway formed in a main section of the valve housing, said retainer clip being received in an annular groove formed adjacent one end of the main section, and a seal extending around said end fitting and sealing a joint between said end fitting and said main section.

14. A valve apparatus for regulating flow of a heat exchange liquid which is available at a relatively low first temperature and at a relatively high second temperature, said valve apparatus comprising:

a valve housing having first and second chambers formed therein and separated by an integral interior wall, first inlet and outlet ports for flow of a primary liquid into and out of said first chamber, and further ports for flow of said heat exchange liquid at said first and second temperatures into and out of said second chamber, and a valve seat arrangement, said housing including a separable one-piece end fitting forming an end of said second chamber forming one of said further ports comprising an inlet for said heat exchange liquid at said second temperatures;

a linear actuator mounted in said valve housing adjacent said interior wall, said actuator including an actuator body containing a heat expansible material and a piston which, during use of the apparatus, is movable from a retracted position to an extended position by expansion of said material due to a predetermined increase in the temperature of said material because of an elevated temperature of said primary liquid in said first chamber, at least a substantial portion of said actuator body being located in said first chamber; and a valve mechanism operable by and connected to said piston of the linear actuator, located in said second chamber, and adapted to control the flow of said heat exchange liquid at each of said first and second temperatures through the second chamber, said valve mechanism including a valve member connected to said piston and movable by said piston between a closed position where said valve member engages said valve seat arrangement and an open position where said heat exchange liquid at one of said first and second temperatures can flow through and out of said second chamber during use of the valve apparatus, an end section of said valve member remote from said piston being slidable in a guide passage formed in a central valve supporting section of said end fitting.

15. A valve apparatus according to claim 14 wherein said interior wall forms a cavity and an expanded end section of said actuator body is fixedly mounted in said cavity.

16. A valve apparatus according to claim 15 including a retainer clip mounted in a groove formed inside said valve housing, said retainer clip holding said expanded end section of this actuator body in said cavity.

17. A valve apparatus according to claim 14 wherein said interior wall has a central opening formed therein and a plastic end portion of said actuator body is mounted in said central opening so as to be in contact with said heat exchange liquid in said second chamber during use of the valve apparatus.

18. A valve apparatus according to claim 14 wherein said piston is made of plastic of low thermal conductivity and said valve housing including said interior wall is also made of plastic having low thermal conductivity.

* * * * *